W. DICKINSON.
DETACHABLE INCLOSURE FOR MOTOR VEHICLES.
APPLICATION FILED MAR. 1, 1919.

1,400,271.

Patented Dec. 13, 1921.
3 SHEETS—SHEET 1.

Witness
J. N. Lyles

Inventor
William Dickinson
By F. L. Colfax
Attorney

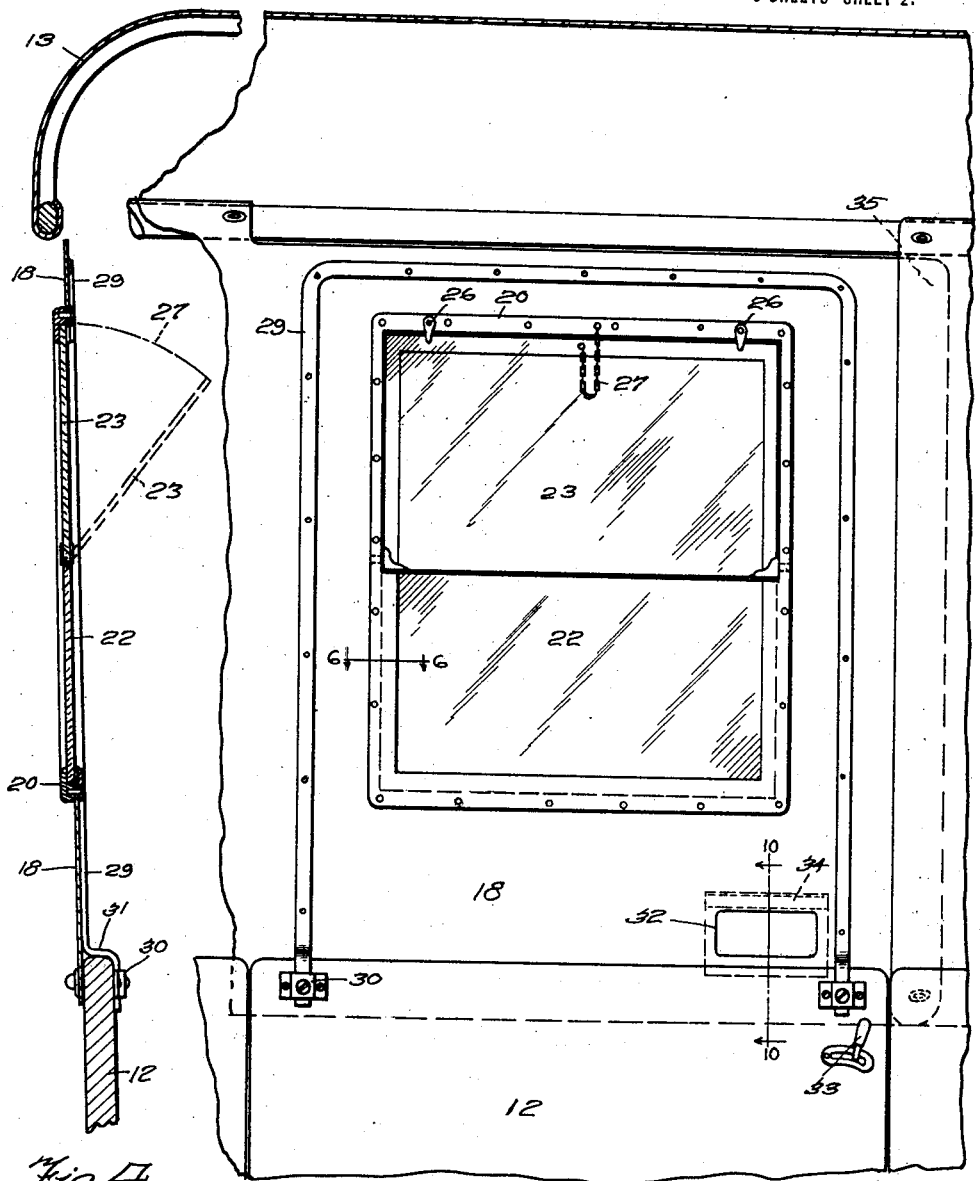

W. DICKINSON.
DETACHABLE INCLOSURE FOR MOTOR VEHICLES.
APPLICATION FILED MAR. 1, 1919.

1,400,271. Patented Dec. 13, 1921.
3 SHEETS—SHEET 3.

Inventor
William Dickinson
By F. W. Cofford
Attorney

Witness

UNITED STATES PATENT OFFICE.

WILLIAM DICKINSON, OF DETROIT, MICHIGAN.

DETACHABLE INCLOSURE FOR MOTOR-VEHICLES.

1,400,271.  Specification of Letters Patent.  Patented Dec. 13, 1921.

Application filed March 1, 1919. Serial No. 280,081.

*To all whom it may concern:*

Be it known that I, WILLIAM DICKINSON, a citizen of the United States, residing at Detroit, in the county of Wayne and State of Michigan, have invented new and useful Improvements in Detachable Inclosures for Motor-Vehicles, of which the following is a specification.

The present invention relates to top inclosures for bodies of automobiles and the like, and has particular reference to a transparent inclosure adapted to be used in conjunction with the ordinary automobile top and which may be detachably secured to the vehicle.

Another object is to provide tapering means for the inclosure adapted to be fitted to the ordinary automobile top for conforming the inclosure to the forward tapering end of the vehicle body to not only preserve the symmetrical lines of the body but also to facilitate a clear observation by the operator from both sides and in front of the vehicle.

Among various other objects and advantages of the invention are means for detachably supporting certain sections of the inclosure upon the doors of the vehicle body, and to provide means for ventilation of the vehicle body by a peculiar arrangement of the transparent panels in the inclosure, and to provide a relatively simple and inexpensive structure which may be constructed partly from aluminum or other like metal, and applied to automobiles of various types and sizes.

Various other objects and advantages of the invention will be perfectly understood from the particularly described following detailed description of the present approved embodiment, the same being illustrated in the accompanying drawings, wherein—

Fig. 3 is a fragmentary inner side elevation of a portion of the inclosure as applied to the body and the top.

Fig. 4 is a fragmentary vertical section, enlarged, taken substantially in the plane indicated by line 4—4 in Fig. 1, the dotted line showing a portion of the transparent panel in open position.

Figure 1:
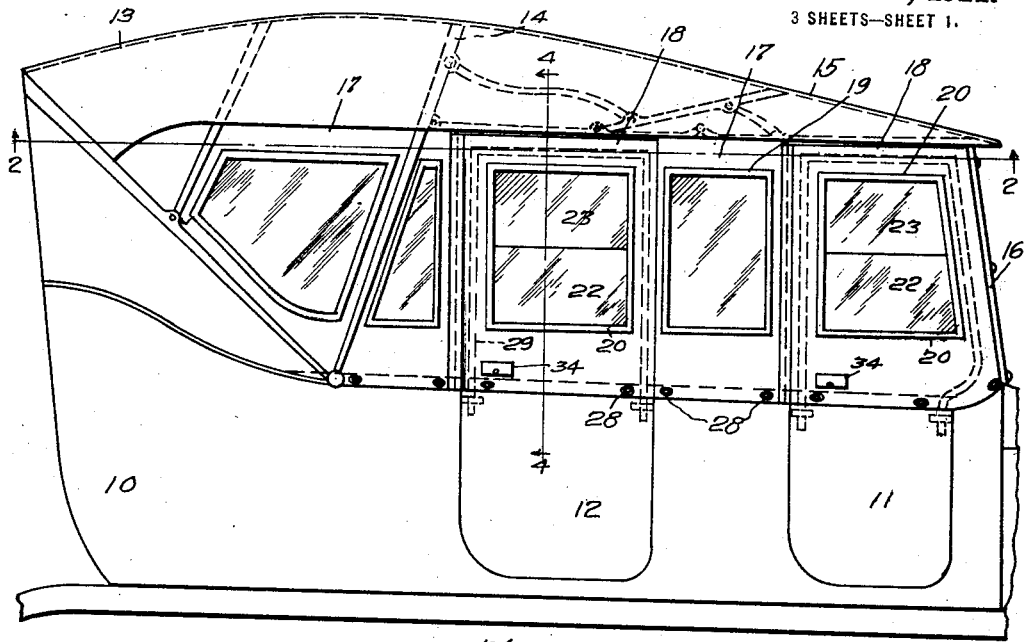
Figure 1 is a side elevation of a motor vehicle body, provided with a top, and having the inclosure constructed according to this invention applied thereto.
Figure 2:
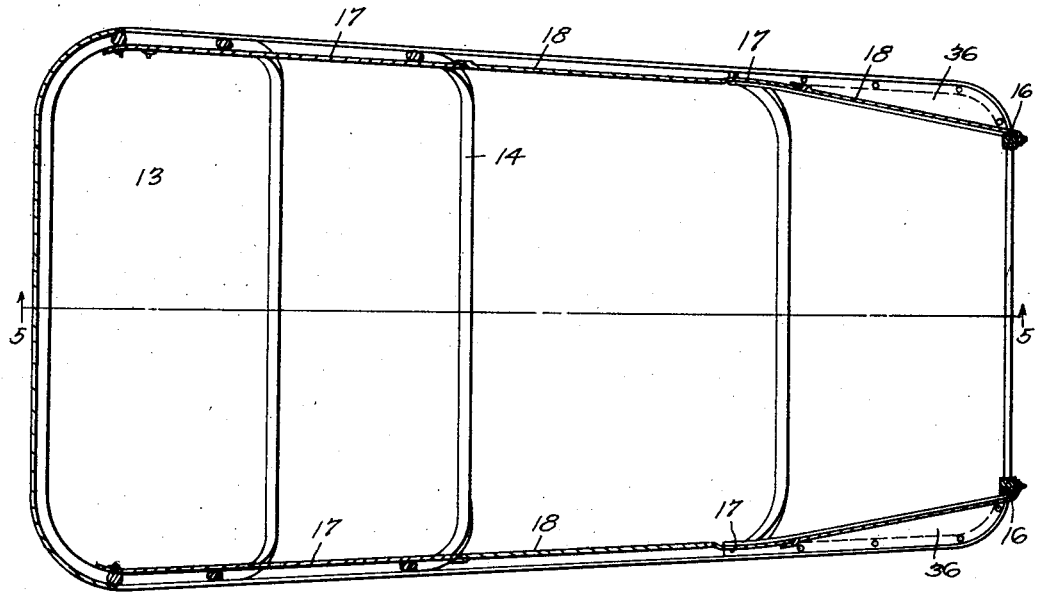
Fig. 2 is a horizontal section taken through Fig. 1 substantially in the plane indicated by line 2—2.
Figure 5:
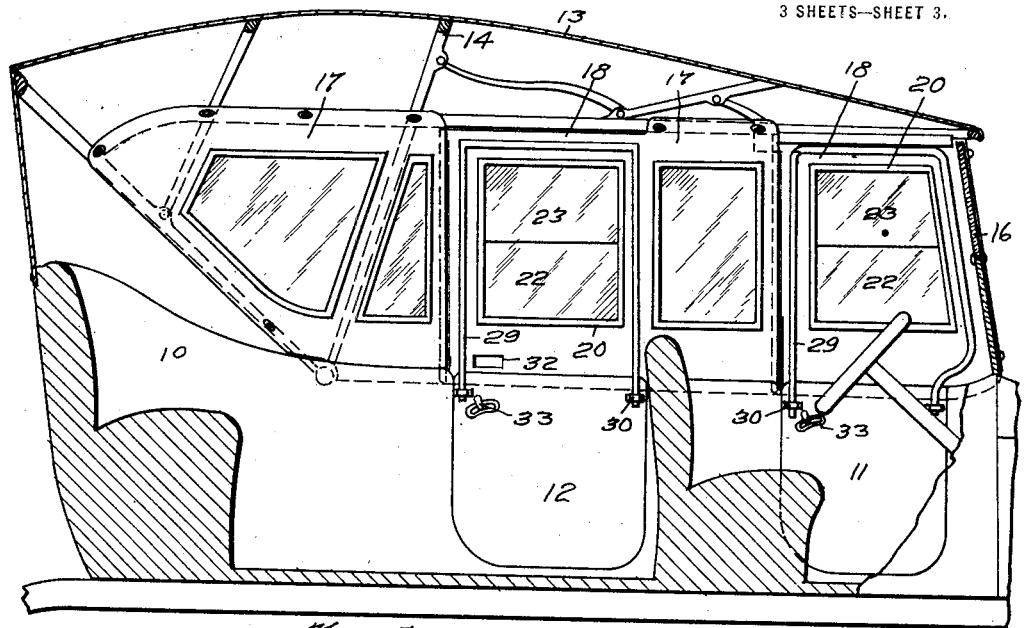
Fig. 5 is a longitudinal section taken through a motor vehicle with the inclosure applied thereto on the line 5—5 of Fig. 2.

Referring to the drawings 10 designates the body of a motor vehicle having the usual fore and rear doors 11 and 12, and having a top 13 of the usual construction provided with ribs 14 and suitable covering 15. The body 10 is also provided with a wind-shield 16, which, as usual, is of less width than the width of the major portion of the body 10 so as to conform to the tapering end of the body, the wind-shield fitting at its upper end beneath the forward portion of the top.

Figure 6:
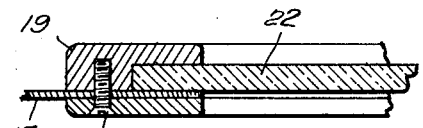
Fig. 6 is a fragmentary section taken substantially on line 6—6 of Fig. 3 and showing the mounting of the transparent panel in one of the removable curtain or inclosure sections.
Figure 8:
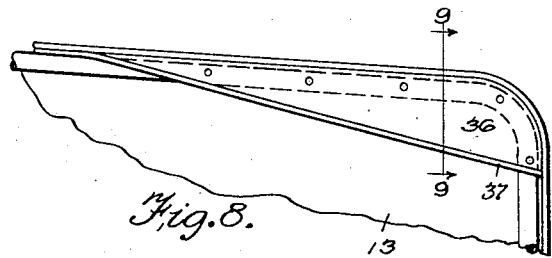
Fig. 8 is an underside plan view of the forward corner of the vehicle top having the former plate attached thereto.

The inclosure for the vehicle, constructed according to the present invention, comprises a plurality of side curtains or panels 17 and 18, the curtains 17 being secured in the usual manner between the body 10 and the top 13 at opposite sides of the doors 11 and 12, and the curtains 18 being carried upon the doors to open and close therewith. The curtain sections may be composed chiefly of the usual curtain fabric and are each provided with window frames 19 and 20. The frames 19 and 20, as shown in Fig. 6, are formed of inner and outer frame sections adapted to be clamped against opposite sides of the curtain, such as 17, about an opening therein, the sections of the frame being held together by screws 21 or the like for pinning the curtain material between the sections. The inner section of each frame is rabbeted or otherwise provided with an annular groove in which may be seated the marginal edge portion of the transparent pane 22 to form a window through which light may pass and through which the occupants of the vehicle may observe the road and surrounding objects.

Figure 7:
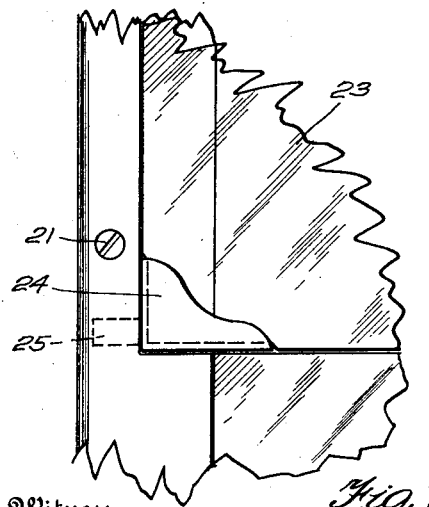
Fig. 7 is a fragmentary enlarged elevation of the hinged connection between the detachable transparent panel and its frame.

The window frames 20 are of similar construction with the exception that the upper portions of the frames, as shown in Figs. 4 and 7, have panels 23 pivoted therein, the upper portion of the panel being independent of the lower portion thereof and being mounted in corner brackets 24 having trunnions or pins 25 seated between the frame sections for pivotally supporting the upper panel portions and admitting the swinging inwardly of the same, as shown in dotted lines in Fig. 4. Thumb-buttons 26 may be mounted upon the upper portion of the frames 20 for maintaining the panel 23 closed, and a chain 27 or other flexible means may be connected to the frame and to the panel for limiting inward swinging of the latter. By so mounting the panel 23 air is admitted to the upper portion of the vehicle so that the draft is not directly upon the occupants and the interior of the inclosure may be thoroughly ventilated without inconvenience and injury to the occupants. The curtain sections 17 and 18 adjacent the hinged doors 12 may be integral as the lower portions of the curtain sections are secured by thumb buttons 28 to the outer sides of the vehicle body and doors and the flexibility of the curtain sections admit the free swinging of the doors 12 into open and closed positions. The curtain section 18 is supported in upstanding position upon each door by means of a substantially U-shaped supporting frame or rod 29 detachably secured to the respective door, as shown in Fig. 4, by the use of socket bolts or straps 30 secured to the door and into which the lower ends of the frames 29 are adapted to fit. The lower ends of the frames 29 are preferably offset to provide shoulders or supporting portions 31 and adapted to engage across the upper edge of the respective door for maintaining the frame 29 relatively rigid and for holding the respective curtain section 18 flush with the upper surface of the door. Each curtain section 18 is provided with an aperture 32 of sufficient size to admit the passage of the hand through the curtain section to engage the latch releasing handle 33 of the door. Each aperture 32 preferably has a flap or closure 34 adapted to normally close the opening 32. As shown to advantage in Figs. 1 and 3, the curtain sections 18 carried by the doors are provided with extensions or flaps 35 adapted to overlap the adjacent curtain sections 17 which are secured stationary to the body portion of the vehicle and to thus seal the joint between the stationary and movable curtain sections. The tops of the curtain sections 18 terminate in slightly spaced relation to the top 13 of the vehicle so that the doors with their curtain sections may be freely opened and closed, and, as shown in Fig. 4, the upper edges of the curtain sections 18, when closed, lie within the vertical plane of the side portion of the top 13.

Figure 9:
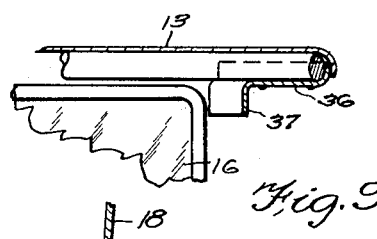
Fig. 9 is a fragmentary enlarged section taken through the same on line 9—9 of Fig. 8.
Figure 10:
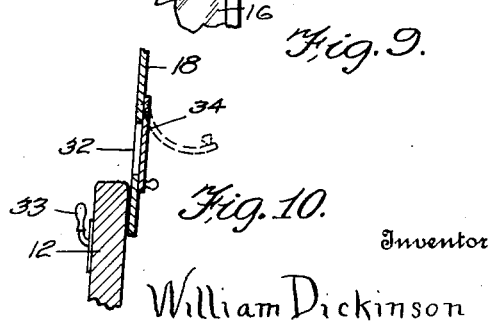
Fig. 10 is an enlarged fragmentary section taken through the upper portion of the vehicle body door and adjacent portion of the inclosure taken on line 10—10 of Fig. 3.

A novel feature of the present invention is the provision of filler plates 36 at each side and at the forward end of the top, the latter being secured along the outer marginal edge portion of the top, projecting horizontally inward, as shown in Fig. 9, and terminating at its inner edge in a depending flange 37 which converges forwardly to follow the general lines of convergence of the body 10 and to meet in a straight line the lateral edges of the wind shield 16. The inclosure thus formed at the forward end of the vehicle provides a transparent panel at opposite sides of the wind-shield so located as to give a clear vision to the operator and allow admitting a greater amount of light than in the construction of inclosed bodies wherein the side panels are spaced from the wind-shield and are more nearly in parallelism with the sides of the body 10. The depending flanges 37 are adapted to receive thereagainst the upper portions of the hinged curtain panels 18 for sealing the top of the inclosure when the door is closed and for bracing the panels against pressure of wind and the like, such as when the vehicle is in rapid motion.

The inclosure curtains of this invention may be readily applied to the bodies and tops of motor vehicles of various types, the filler plates 36 being permanently secured to the tops and remaining in position when the curtain sections are removed. The curtain sections, as shown, are detachably held in place upon the body 10 and top 13 by the usual thumb button, and the door frames 29 are readily detachable from the sockets when the doors are swung open so as to completely detach the curtain sections 18 from the doors when desired. It is also readily seen that should it be desired to admit air to the inclosure, the occupants of the vehicle may quickly and easily turn the thumb buttons 26 and draw the top sections of the transparent panels 23 inwardly and the incoming air being deflected into the top of the vehicle over the heads of the occupants and thus ventilate the inclosure without causing a direct draft upon the heads of the occupants. The outer sections of the frames 20 form abutments against which the hinged panels 23 are held when closed and the inner sections of the frames 20 are reduced in width to admit the free swinging inwardly of the panels.

What is claimed is:—

1. A filler member for an automobile top having side curtains, comprising a body plate of substantially triangular form rolled over at its shorter sides to fit the front bow of the top for rigidly supporting the body plate beneath the forward corner of the top, said body plate having a depending flange along its longer side following the general direction of the side of the automobile and against which the forward side curtains are adapted to seat for sealing the curtains against the top.

2. A filler plate for an automobile top having side curtains, comprising a stiff sheet metal body of substantially triangular form adapted to fit beneath the top at the forward corner thereof and having a depending stop flange along its hypothenuse side adapted to follow the general direction of the side of the vehicle and against which the upper edges of the forward side curtains are adapted to engage for sealing the curtains beneath the top, said sheet metal body having its outer edges rolled upwardly to fit about the forward bow of the top beneath the covering thereof to support the sheet metal body rigidly on the top.

3. A side curtain for vehicles comprising a curtain section having an opening therein, inner and outer frame sections clamped against opposite sides of the curtain section at the edge of the opening, a two-part transparent panel carried in the frame sections, a hinge for the lower portion of the upper panel part, and means for detachably holding the hinged panel part against the frame.

In witness whereof I have hereunto affixed my signature.

WILLIAM DICKINSON.